US007876543B2

(12) United States Patent
Hopkins et al.

(10) Patent No.: US 7,876,543 B2

(45) Date of Patent: Jan. 25, 2011

(54) GAS DISCHARGE LAMP POWER SUPPLY

(75) Inventors: William T. Hopkins, Dickson, TN (US); Anthony W. Banks, Dickson, TN (US); Alan M. Smith, Dickson, TN (US); Louis B. Pickvet, Burns, TN (US); Robert L. Towe, Fairview, TN (US); Charles A. Schlemm, Burns, TN (US)

(73) Assignee: FRANCE/ A Scott Fetzer Company, Fairview, TN (US)

( * ) Notice: Subject to any disclaimer, the term of this patent is extended or adjusted under 35 U.S.C. 154(b) by 1099 days.

(21) Appl. No.: 11/551,481

(22) Filed: Oct. 20, 2006

(65) Prior Publication Data

US 2007/0041202 A1 Feb. 22, 2007

Related U.S. Application Data

(62) Division of application No. 11/091,350, filed on Mar. 28, 2005, now Pat. No. 7,283,351.

(51) Int. Cl.
*H02H 3/14* (2006.01)

(52) U.S. Cl. ...................... 361/88; 361/91.4; 361/93.1; 361/42; 361/38

(58) Field of Classification Search .................. 361/38, 361/42, 35, 54–57, 63–67, 88, 90, 91.1, 91.4, 361/91.5
See application file for complete search history.

(56) References Cited

U.S. PATENT DOCUMENTS 5,847,909 A 12/1998 Hopkins et al.
6,040,778 A 3/2000 Hopkins et al.
6,366,208 B1 4/2002 Hopkins et al.

*Primary Examiner*—Tuyet Thi Vo
(74) *Attorney, Agent, or Firm*—Wood, Herron & Evans, LLP

(57) ABSTRACT

A gas discharge lamp power supply having a base, a pair of opposed side walls extending from the base, and opposed first and second end walls extending from the base between the opposed side walls. The first end wall has a sloped wall extending angularly between the side walls, and two input terminals are mounted on the sloped wall. In another embodiment, the power supply has a control with a nonvolatile memory for storing an error code in response to a detected fault condition, thereby permitting the error code to be displayed upon power being removed from and then, subsequently reapplied.

3 Claims, 15 Drawing Sheets

GAS DISCHARGE LAMP POWER SUPPLY

RELATED APPLICATIONS

The present application is a Divisional Application of application Ser. No. 11/091,350, filed on Mar. 28, 2005 now U.S. Pat. No. 7,283,351, which is hereby expressly incorporated by reference herein.

FIELD OF THE INVENTION

The present invention relates generally to gas discharge lamps and, more particularly, to a gas discharge lamp power supply.

BACKGROUND OF THE INVENTION

One example of a gas discharge lamp is neon tubing, which is often used in signage. Although the following discussion will refer to transformers used for neon tubing or signs, it will be understood that principles of the present invention have application to transformers for other gas discharge tube lamps as well. Power supplies for neon signs use a transformer to convert a low impedance, low voltage power source, for example, a known 60 Hz AC line power having a line voltage in a range of about 100-250 Volts ("VAC"), to a higher voltage source, for example, 15 KiloVolts, suitable for illuminating the neon sign. The 120 Volt AC line power is connected to a low voltage primary winding of the transformer and the high voltage secondary winding of the transformer is connected to the neon sign.

A known gas discharge lamp power supply 20 is shown in FIGS. 12 and 13. The power supply 20 has a baseplate 22, a pair of opposed side walls 24, 26 and a pair of end walls 28, 30. The side walls 24, 26 are substantially perpendicular to the end walls 28 and 30 and all of the walls 24-30 are substantially perpendicular to the baseplate 22. A cover 32 is fastened over the walls 24-30 to form a housing or enclosure 34. Input terminals 36, 38 are provided for connecting respectively a black wire and a white wire of a line voltage source, for example, 120 VAC. A ground terminal 40 is provided for connecting to a ground wire of the line voltage source and is connected to an equipment ground, that is, a green wire ground, within the power supply 20.

A gas discharge lamp, for example, neon tubing, is connected to the high voltage output terminals 42, 44. The power supply 20 is often placed at locations that are not immediately adjacent to the neon tubing and often are not easily accessible. For example, the power supply 20 may be placed in an attic area of a building adjacent a wall supporting a neon sign. In other applications, the power supply 20 may be dropped into an electrical raceway that is accessible only from a top side. If the power supply 20 is placed in a raceway, only the cover 32 is easily seen The terminals 36-44 and switch 46 extend from generally vertical end walls 28, 30 and are difficult to access. Further, the LED 48 also being on a vertical end wall is difficult to see and may require some determination on the part of a service person to view. Thus, the gas discharge lamp power supply 20, when placed in an electrical raceway, that itself may not be readily accessible, presents various challenges to service personnel in attempting to troubleshoot and repair the power supply.

A concern with known neon sign power supplies is that a potentially dangerous ground fault current may occur anytime there is a relatively low impedance path from one of the high voltage output leads of the neon power supply to ground. Such a path may be formed if a neon sign is carelessly installed so that one of the output leads connected to the sign is in contact with a low impedance in a window frame, doorway, or other ground-connected relatively low impedance. To detect ground fault current, a ground fault detection circuit is connected to the secondary winding of the power supply transformer; and if a secondary ground fault is detected, power to the transformer circuit is automatically interrupted.

Other concerns with known neon sign power supplies are that an installer or service person may inadvertently reverse the line power connections to the low voltage input terminals of the power supply, or an equipment ground may be improperly connected. In other situations, an installer may connect a neon sign power supply that is rated for a lower voltage, for example, 120 VAC to a higher line voltage, for example, 277 VAC. In this example, the power supply will function normally for some period of time but will then fail.

As previously noted, troubleshooting a neon sign for ground faults and other problems is difficult because often the power supply may be located in a building attic area or an electrical raceway, which makes the power supply hard to view and access. Further, in such a location, improper and/or poor connections and ground faults are rarely visibly detectable and servicing the power supply is difficult. Known gas discharge lamp power supplies enable an installer or field engineer to identify and pinpoint the location of a ground fault quickly and accurately, thereby speeding installation and minimizing the temptation for tampering with the ground fault detection circuitry. Various neon sign power supplies, circuits connectable thereto and methods for diagnosing faults are known and described in U.S. Pat. Nos. 6,366,208; 6,040,778 and 5,847,909, which patents are hereby incorporated in their entirety by reference herein.

It is known in a neon sign power supply to create error codes that identify respective fault conditions and communicate those error codes to an installer or service person by illuminating one or more visual indicators, for example, the gas discharge lamp, other lights, LEDs, etc. Further, an error code remains stored and the visual indicator remains illuminated for as long as line power is supplied to the power supply. However, upon approaching a power supply with a reported malfunction, experience, intuition and training cause a service person to first remove line power prior to any handling, visual inspection or other service activity. However, upon removing the line power, the error code stored in the power supply is lost and the visual indicator is turned off. Therefore, the value of the power supply's self diagnostic capability of generating and displaying an error code is lost. Further, upon the service person restoring line power, if the fault condition is intermittent, the error code will not reappear; and the fault identifying visual indicator will not relight. Again, the usefulness of the power supply's self diagnostic capability is lost. Without any guidance as to the source of the problem, especially an intermittent one, the neon sign can experience extended periods of no illumination and downtime.

Thus, there is a need for an improved neon sign power supply that eliminates the disadvantages of known power supplies as discussed above.

SUMMARY OF THE INVENTION

The present invention provides a gas discharge lamp power supply that is more convenient to install and service. The gas discharge lamp power supply of the present invention presents electrical terminals, a service or test switch and an indicator light so that they are more accessible and visible to an installer or service person. The gas discharge lamp power supply of the present invention is especially useful in those applications where the power supply itself is difficult to access, for example, where the power supply is located in an electrical raceway.

The gas discharge lamp power supply of the present invention further has improved fault diagnosing capabilities and can substantially improve the quality of power supply service in the field. The gas discharge lamp power supply is able to display a diagnosed power supply fault condition after line power has been removed and then reconnected and thus, is especially useful when the power supply is experiencing an intermittent fault condition.

According to the principles of the present invention and in accordance with the described embodiments, the invention provides a gas discharge lamp power supply having a base, a pair of opposed side walls extending from the base, and opposed first and second end walls extending from the base between the opposed side walls. The first end wall has a bottom wall extending from the base between the side walls and a sloped wall extending angularly from the bottom wall between the side walls. A cover extends between the side walls and the end walls; and the cover, the side walls and the end walls are fastened together to form an inaccessible enclosure. At least two input terminals are mounted on the sloped wall and at least two output terminals connectable to the gas discharge lamp. In one aspect of this invention, the second end wall has a bottom wall extending from the base between the side walls and a sloped wall extending angularly from the bottom wall between the side walls.

In another embodiment, the gas discharge lamp power supply has a fault detection circuit that provides an error signal in response to detecting a fault condition, and a control with a nonvolatile memory for storing an error code in response to the error signal. An error indicator is connected to the control and is activated by the control in response to the error signal. Storage of the error code in the nonvolatile memory permits the LED to display the error code upon power being removed from and then, subsequently reapplied, to the power supply.

These and other objects and advantages of the present invention will become more readily apparent during the following detailed description taken in conjunction with the drawings herein.

BRIEF DESCRIPTION OF THE DRAWINGS

The accompanying drawings, which are incorporated herein and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Figure 1:
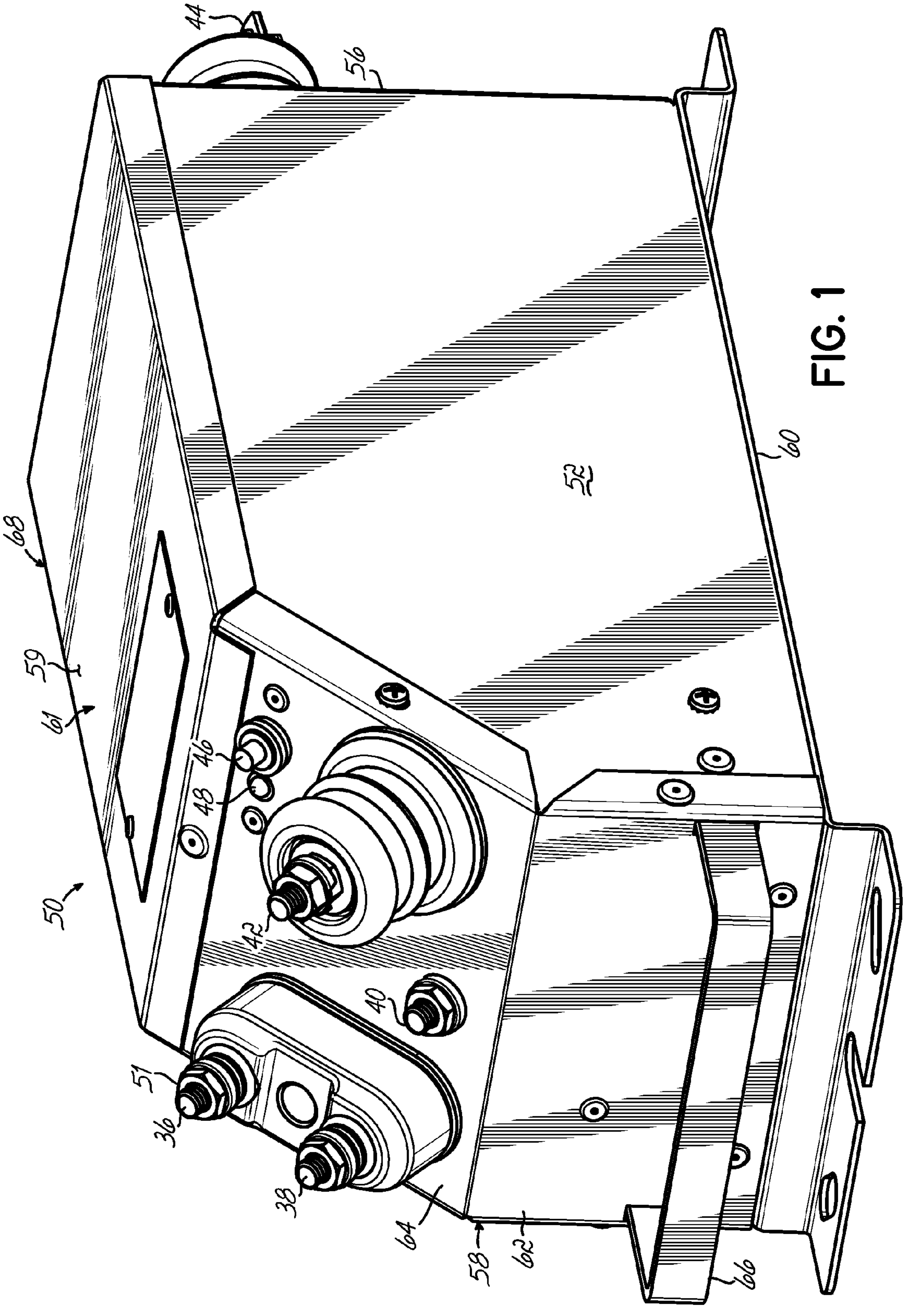
FIG. 1 is a perspective view showing one end of a first embodiment of a gas discharge lamp power supply and a first embodiment of a handle for a gas discharge lamp power supply in accordance with the principles of the present invention.
Figure 2:
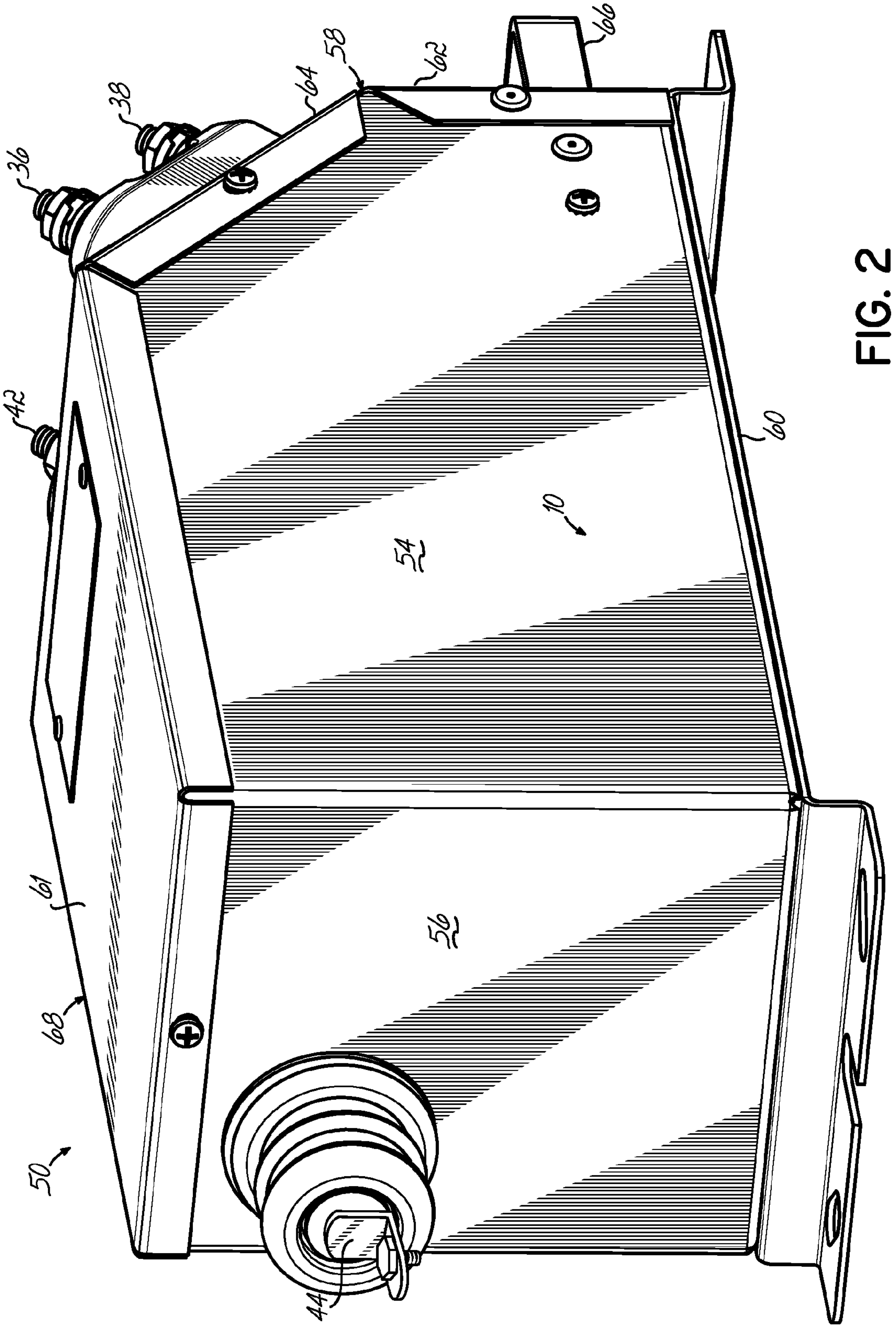
FIG. 2 is a perspective view showing an opposite end of the first embodiment of the gas discharge lamp power supply of FIG. 1.
Figure 14:
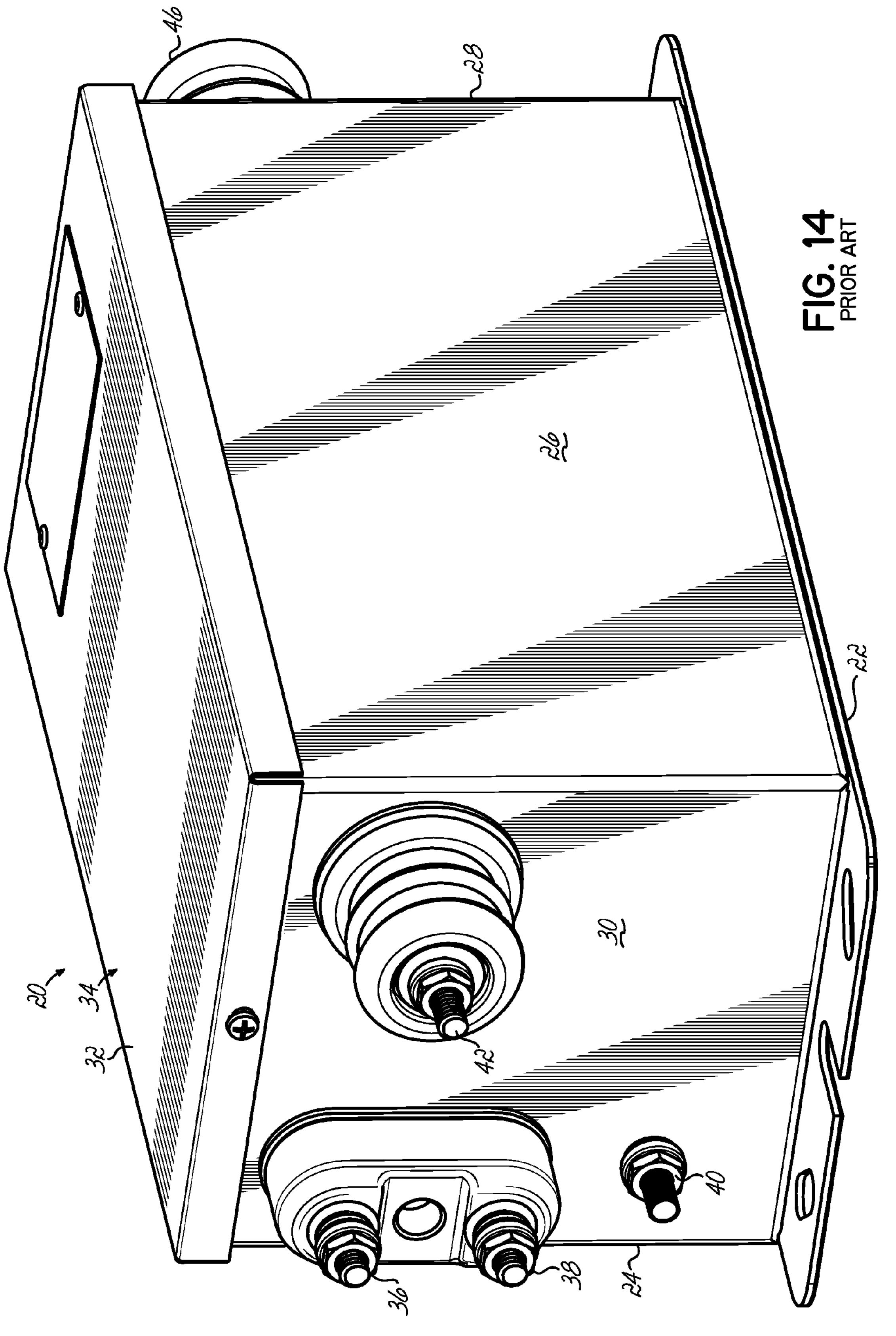
FIG. 14 PRIOR ART
FIG. 14 is a perspective view showing an opposite end of a known gas discharge lamp power supply of FIG. 13.

Referring to FIGS. 1 and 2, in a first embodiment, a gas discharge lamp power supply 50 has a pair of opposed side walls 52, 54 and a pair of opposed end walls 56, 58. The walls 52-56 extend from, and are substantially mutually perpendicular to, the base 60 and are substantially mutually perpendicular to each other. The end wall 58 has a first, lower wall 62 that extends from, and is substantially perpendicular to, the base 60 and the side walls 52, 54. The end wall 58 further has a second, sloped wall 64 that is angled with respect to the base 60, for example, at 45 degrees. However, the sloped wall 64 can have any angle that maintains ends of the terminals 36-44 and associated securing nuts below a plane of a major surface 59 of a cover 61. The cover 61 extends between the walls 52, 54, 56, 64. The base 60, walls 52-58 and cover 61 are fastened together to form an enclosure or housing 68 that contains a transformer and power supply circuit as shown in FIG. 14. It is intended that an interior of the housing 68 be inaccessible. The sloped wall 64 supports the input terminals 36, 38 and output terminal 42. Thus, the sloped wall 64 directs the orientation of the terminals 36, 38, 40 in an upward direction, thereby making them more visible and accessible to an installer or service personnel. In addition, one or more user interface devices, for example, an input device such as a service or test switch 46 and an output display device such as an LED 48, are also mounted on the sloped wall 64 and directed in an upward direction. The upward presentation makes the switch 46 more accessible and the LED 48 easier to view. A handle 66 is attached to the lower wall 62 to facilitate lifting and carrying the power supply 50.

Figure 3:
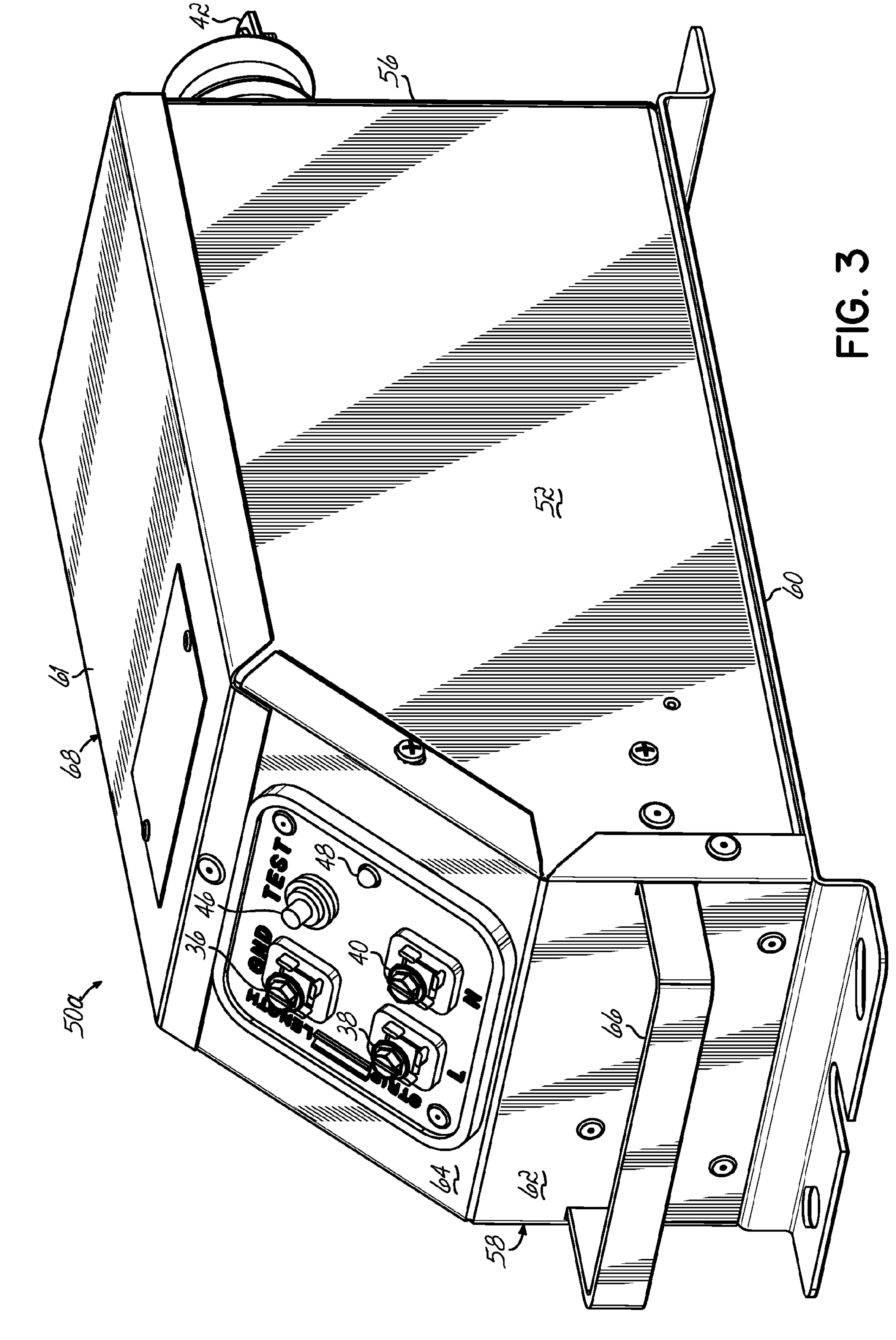
FIG. 3 is a perspective view showing one end of a second embodiment of a gas discharge lamp power supply in accordance with the principles of the present invention.
Figure 4:
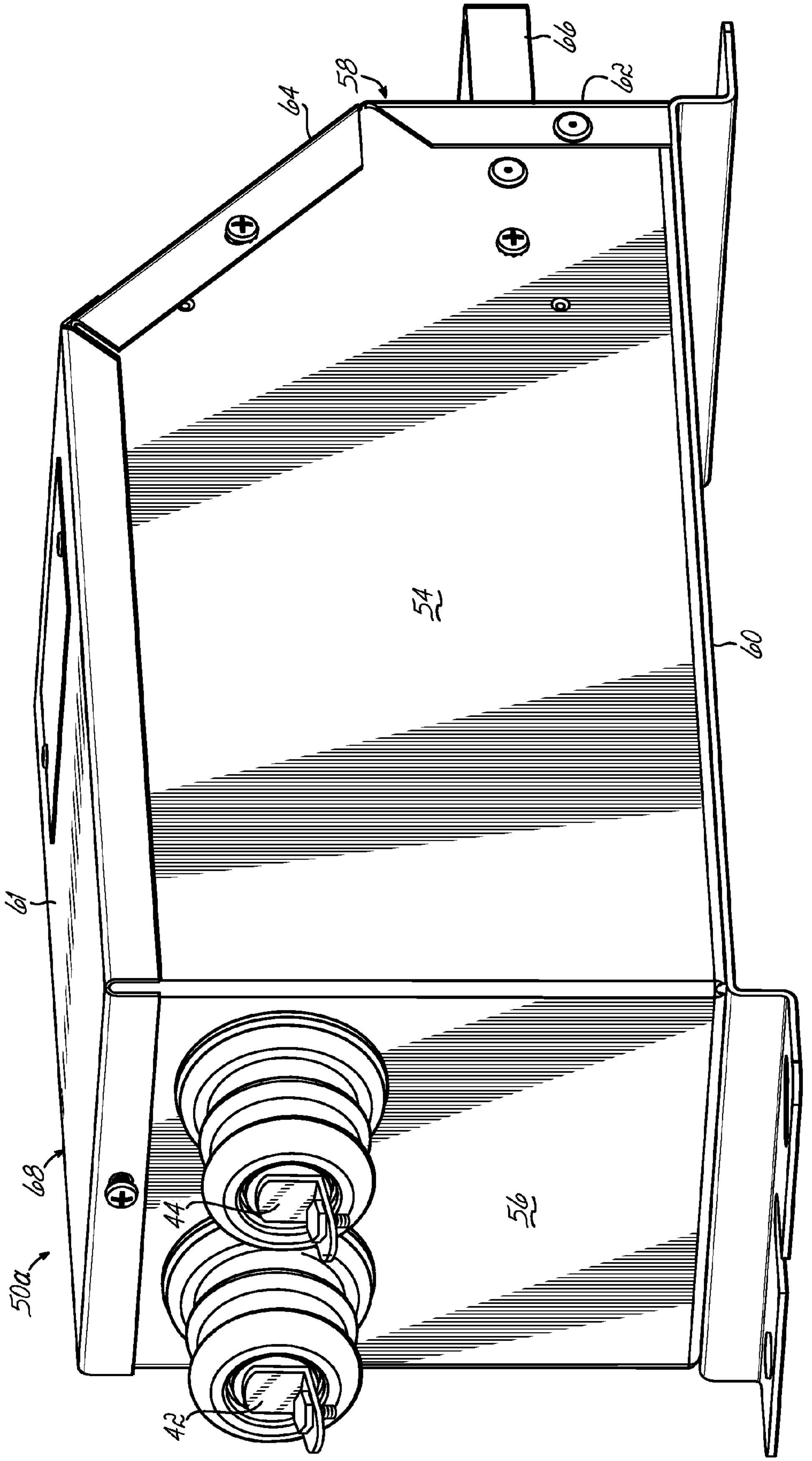
FIG. 4 is a perspective view showing an opposite end of the second embodiment of the gas discharge lamp power supply of FIG. 1.

Referring to FIGS. 3 and 4, in a second embodiment, a gas discharge lamp power supply 50*a* has a housing 68 substantially identical to the housing 68 of the power supply 50 shown in FIGS. 1 and 2. However, with the power supply 50*a*, only the low voltage input terminals 36-40, switch 46 and LED 48 are mounted on the sloped wall 64 of end wall 58. Both of the high voltage input terminals 42, 44 are mounted on the opposite end wall 56.

Figure 5:
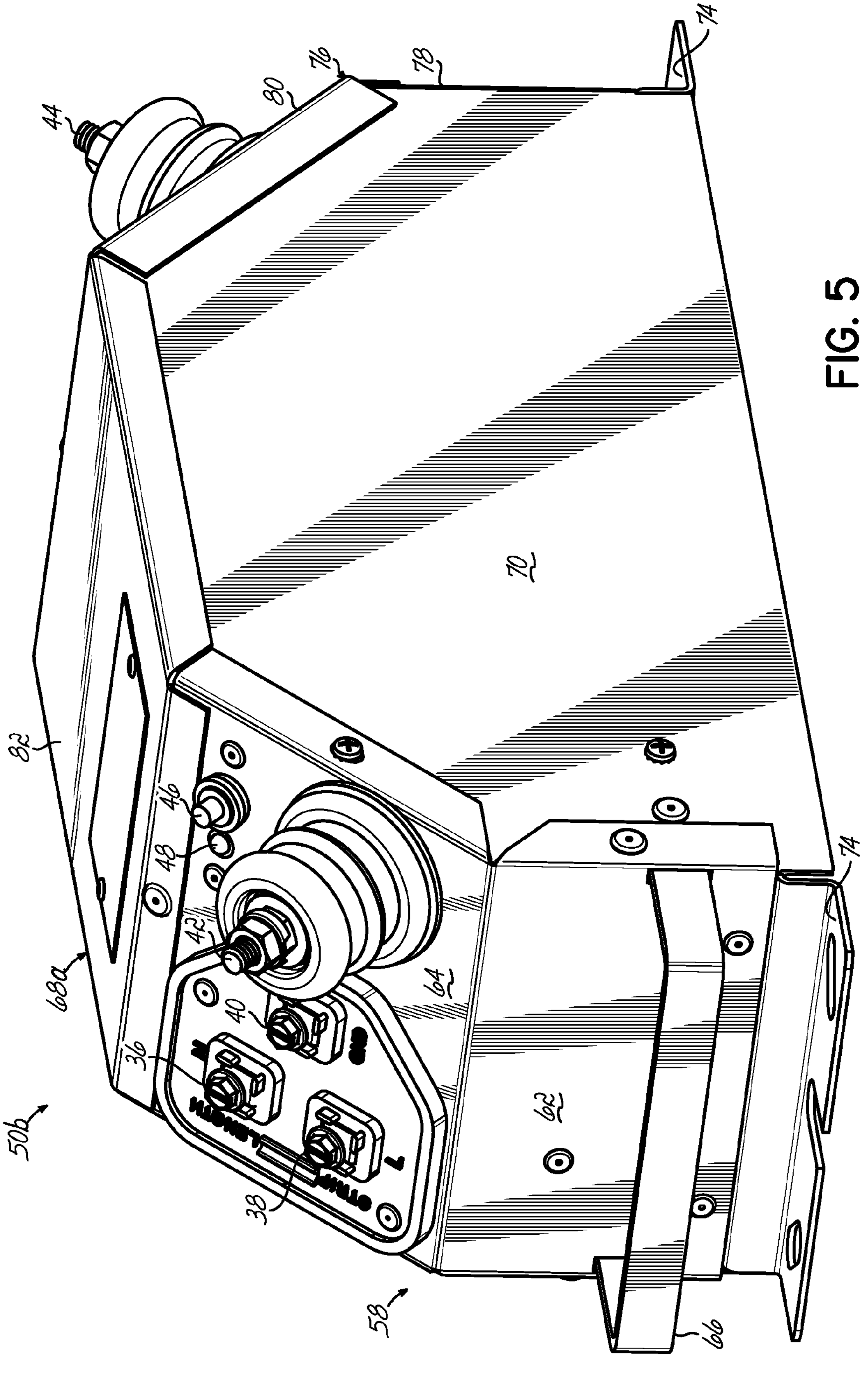
FIG. 5 is a perspective view showing one end of a third embodiment of a gas discharge lamp power supply in accordance with the principles of the present invention.
Figure 6A:
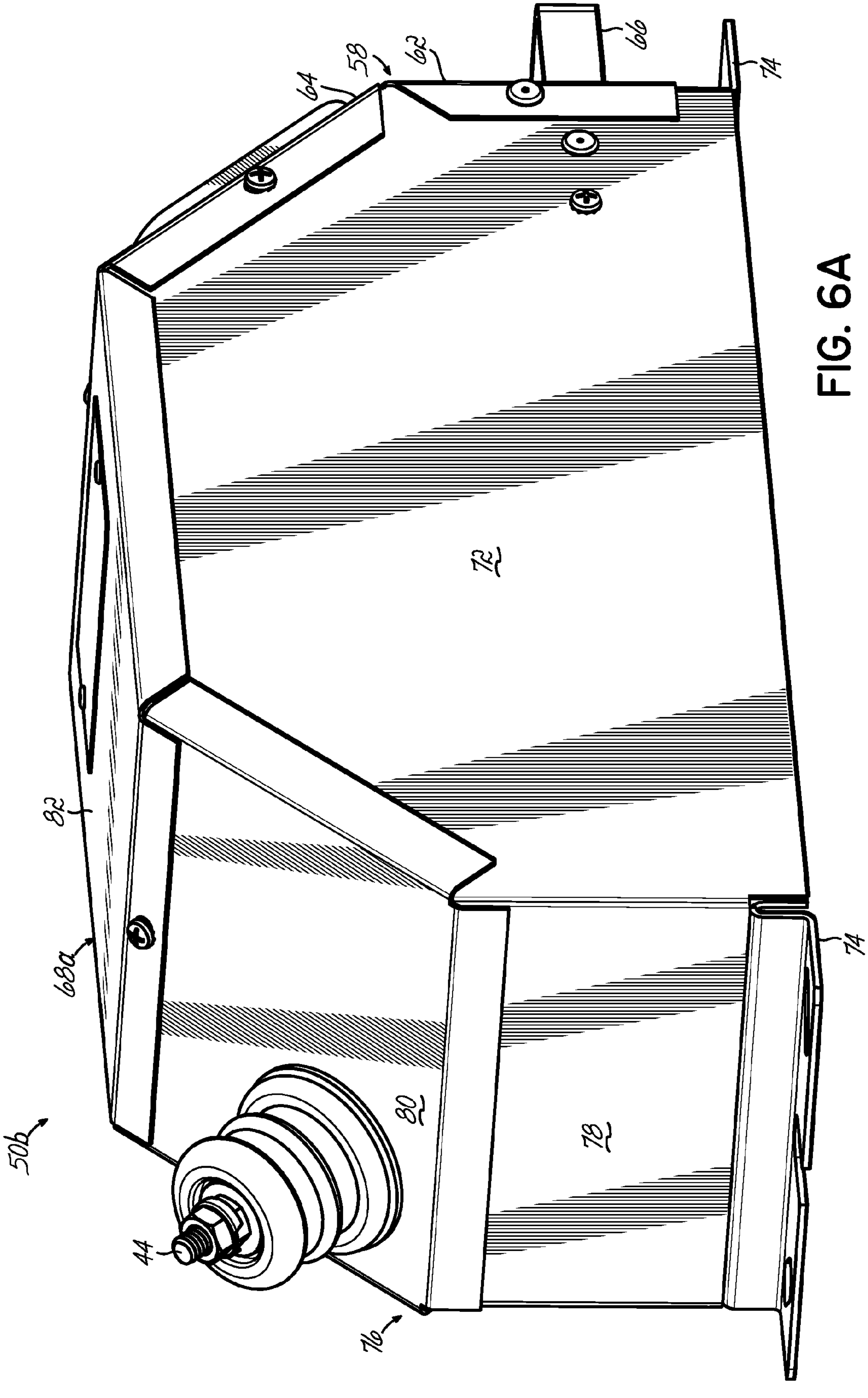
FIGS. 6A and 6B are perspective views showing different embodiments of an opposite end of the third embodiment of the gas discharge lamp power supply of FIG. 1.
Figure 6B:
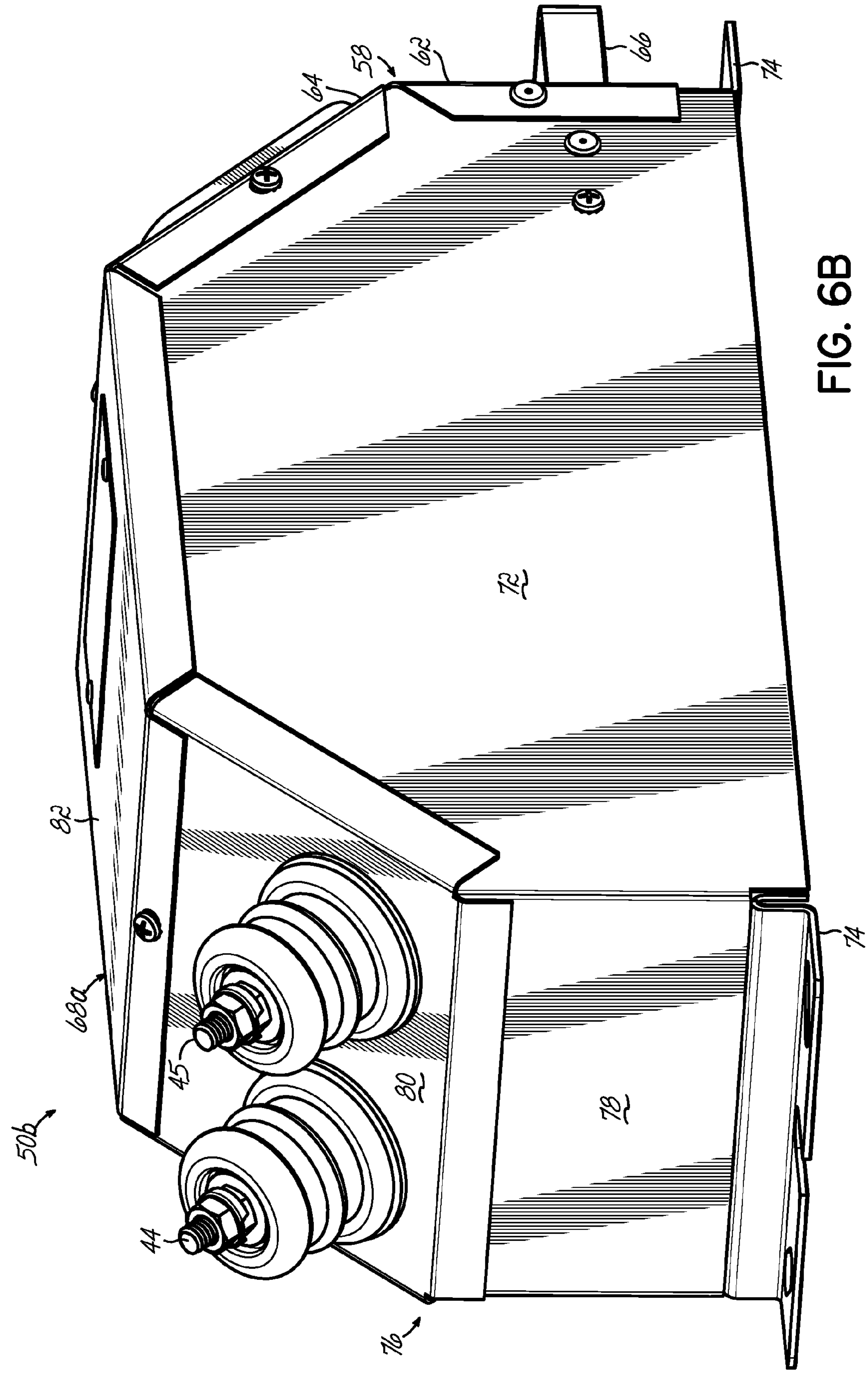

Referring to FIGS. 5 and 6, in a third embodiment, a gas discharge lamp power supply 50*b* has a pair of substantially parallel, opposed side walls 70, 72 that are substantially perpendicular to base elements 74. In the third embodiment, each of the end walls 58, 76 is comprised of respective lower walls 62, 78 that are substantially mutually perpendicular to the side walls 70, 72. In addition, each of the end walls 58, 76 has respective upper, angled or sloped walls 64, 80 that intersect with the side walls 70, 72. A cover 82 extends between the walls 70, 72, 64 and 80. The cover 82, walls 70, 72, 58, 76 and base 74 are fastened together to form an enclosure or housing 68*a* that contains a transformer and power supply circuit as shown in FIG. 14. Thus, in this third embodiment, all of the terminals 36-44, service switch 46 and LED 48 are directed upward from the sloped walls 64, 80 to provide better visibility and access.

Figure 7:
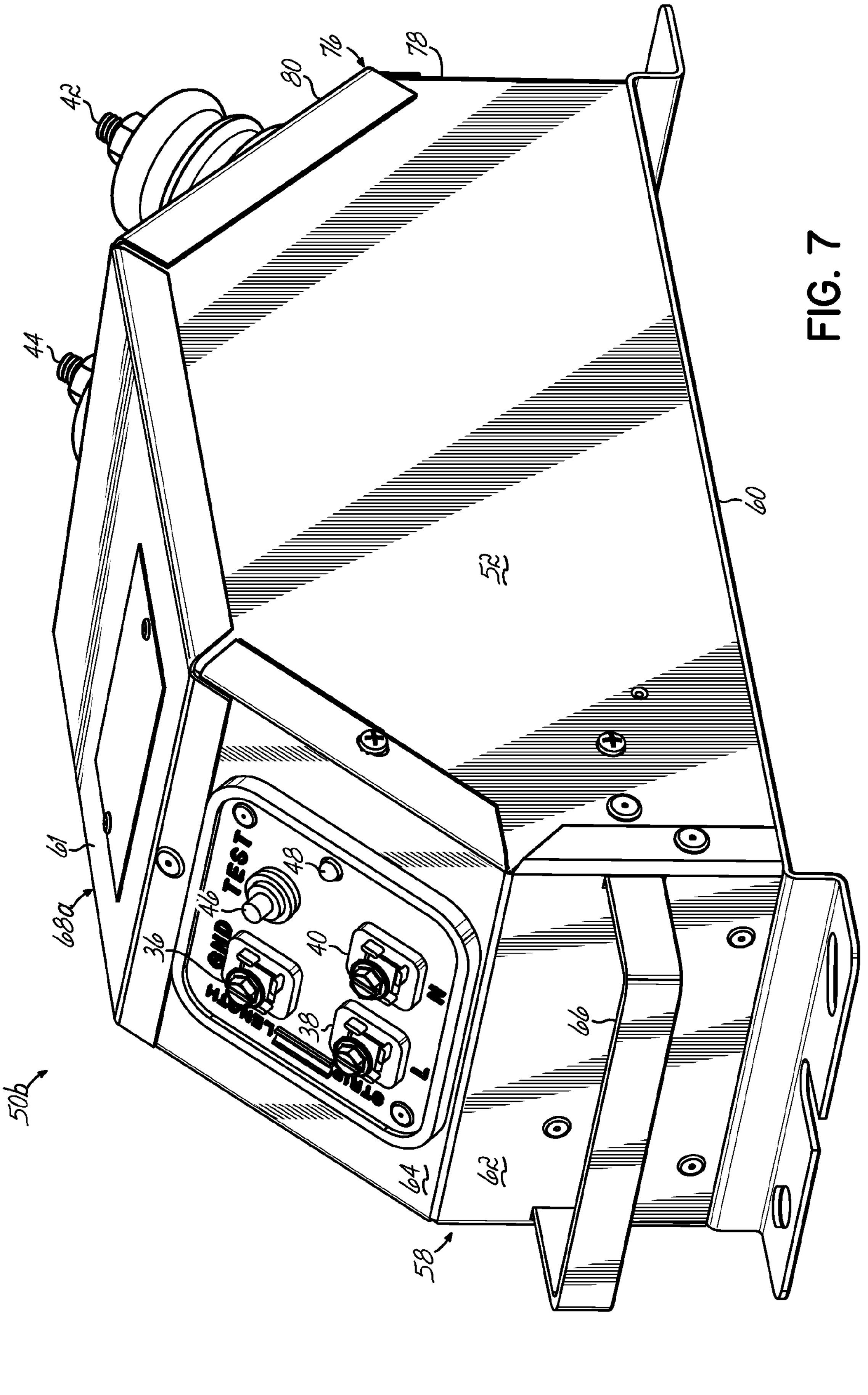
FIG. 7 is a perspective view showing one end of a fourth embodiment of a gas discharge lamp power supply in accordance with the principles of the present invention.

It should be noted that the terminals 36-44, service switch 46 and LED 48 can be positioned in a great many different combinations on the sloped walls 64, 80. For example, in a fourth embodiment represented by FIGS. 5 and 6B, a third, high voltage output terminal 45 can be mounted on the sloped wall 80. The high voltage output terminals 42 and 45 are connected to a common lead or terminal of a secondary winding. Therefore, an installer or service person can have the neon lamp connected to output terminals on only one end 76 or have the neon lamp connections split between the two ends 58, 76. In a further exemplary fifth embodiment shown in FIG. 7, only the low voltage input terminals 36-40, switch 46 and LED 48 are mounted on the sloped wall 64 of end wall 58; and the high voltage input terminals 42, 44 are mounted on the sloped wall 80 opposite end wall 76.

Figure 8:
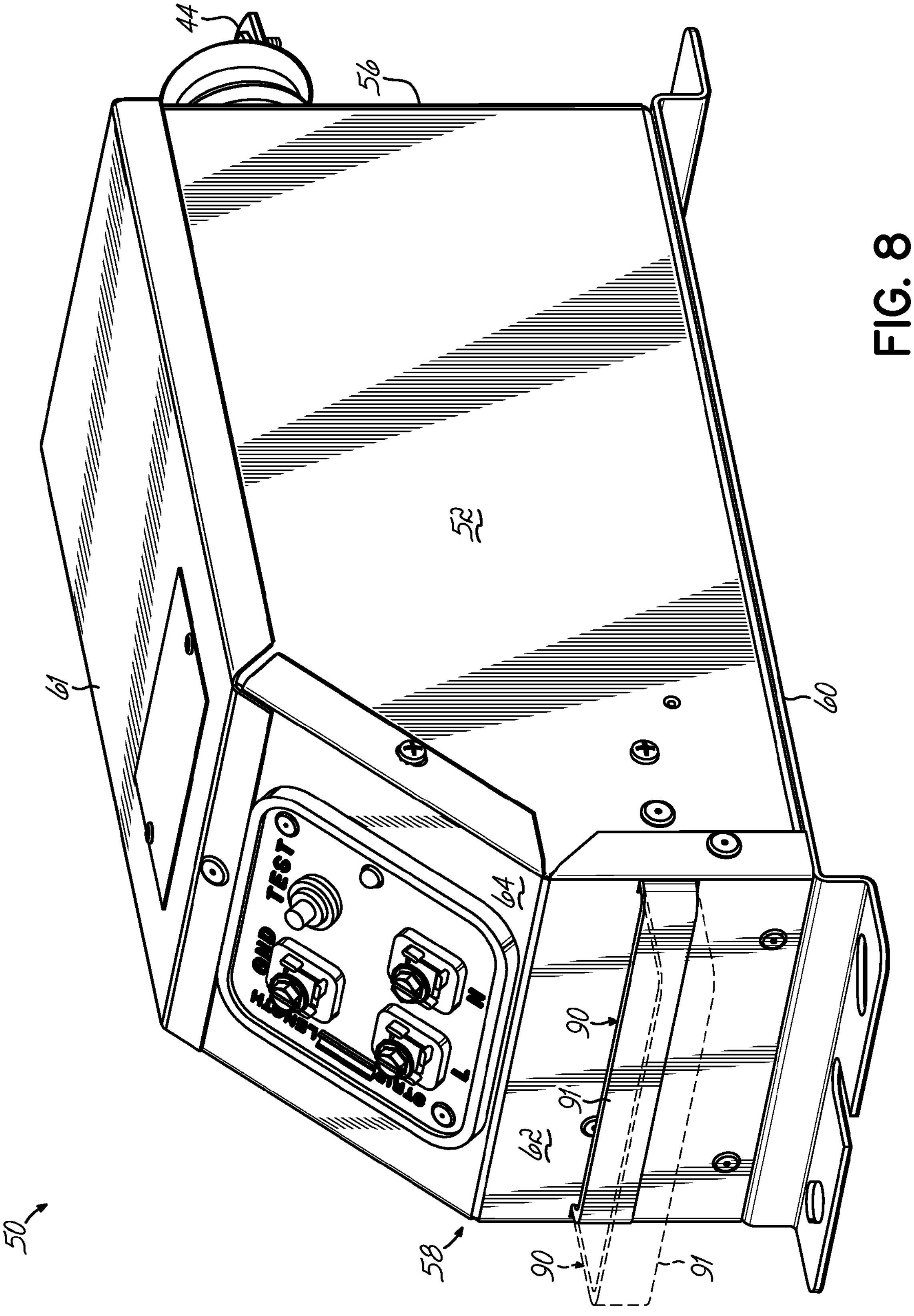
FIG. 8 is a perspective view showing a second embodiment of a handle for a gas discharge lamp power supply in accordance with the principles of the present invention.

In a further embodiment of the gas discharge lamp power supply 50 shown in FIG. 8, as shown in solid lines, the handle 90 has a grip 91 can be pushed to a nonusable position immediately adjacent the lower end wall 62, so that it is noninterfering. However, when it is desirable to move the power supply 50, the handle grip 91 can be pulled out to an extended usable position, as shown in phantom, thereby allowing the power supply 50 to be lifted and carried.

Figure 9A:
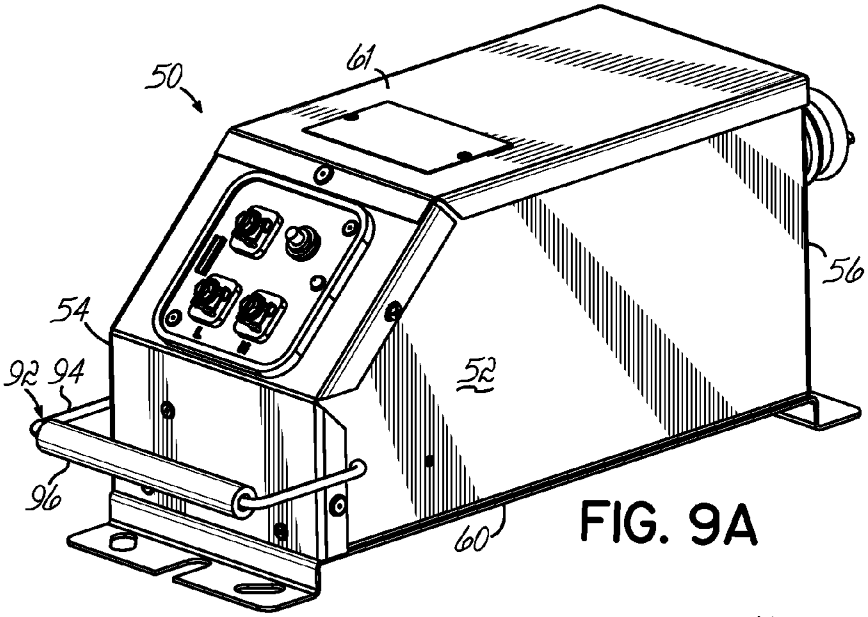
FIGS. 9A-9C are perspective views showing a third embodiment of a handle for a gas discharge lamp power supply in accordance with the principles of the present invention.
Figure 9B:
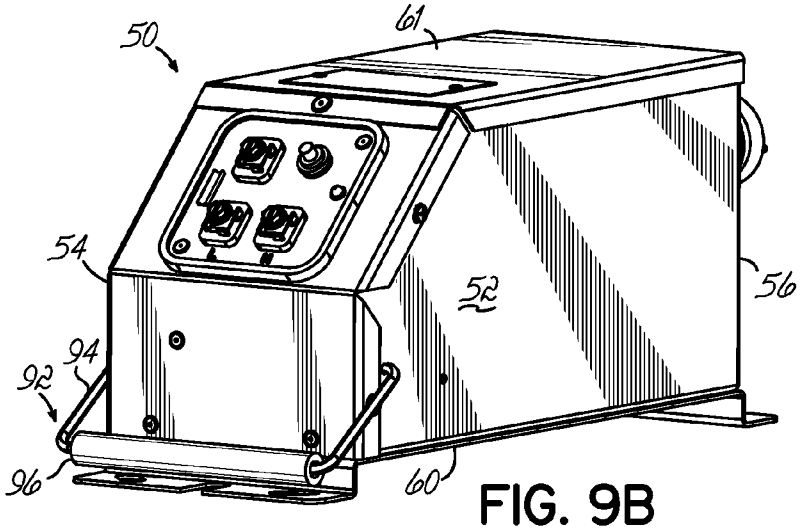
Figure 9C:
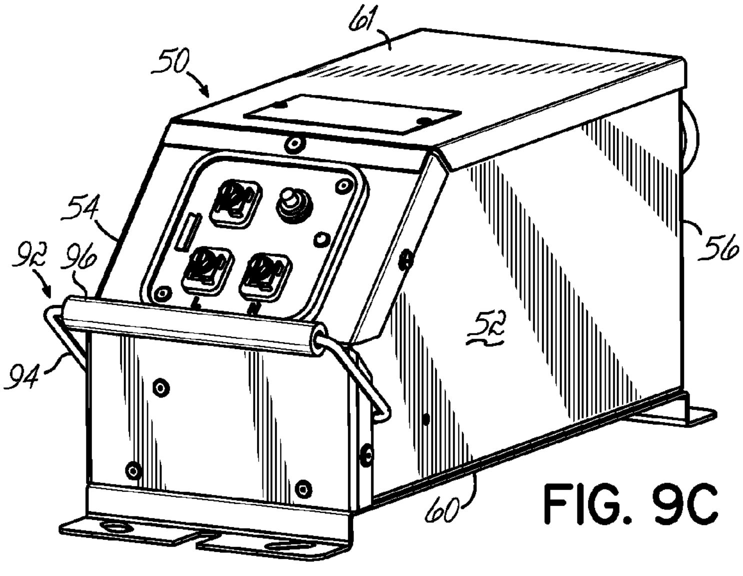

Another embodiment of a handle is illustrated in FIGS. 9A-9C in which a handle 92 is formed from a wire or rod 94. The ends of the rod 94 are inserted into opposing side walls 52, 54 in a manner allowing the handle 92 to freely pivot with respect to the power supply 50. The handle 92 has a grip 96 made of a softer material, for example, a rubber or plastic material, which makes the handle 92 more comfortable for a user.

Figure 10A:
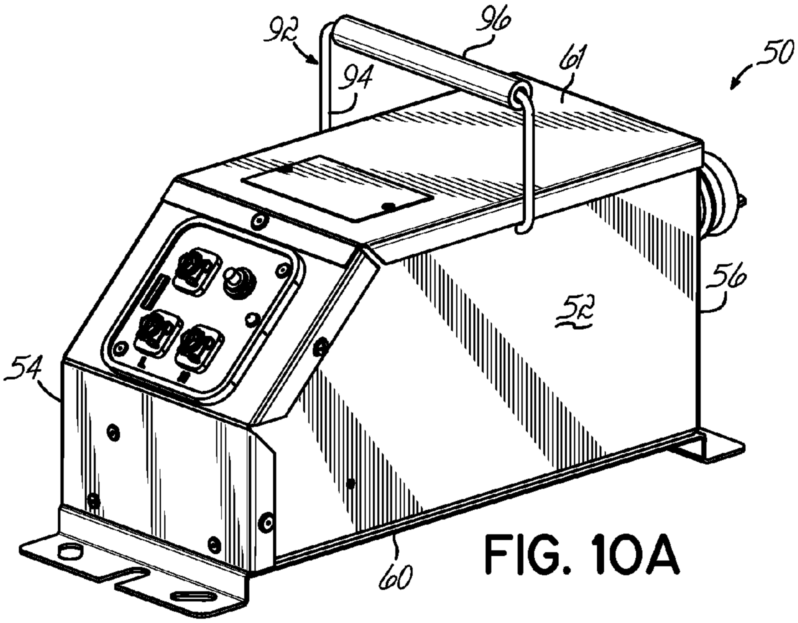
FIGS. 10A-10C are perspective views showing a fourth embodiment of a handle for a gas discharge lamp power supply in accordance with the principles of the present invention.
Figure 10B:
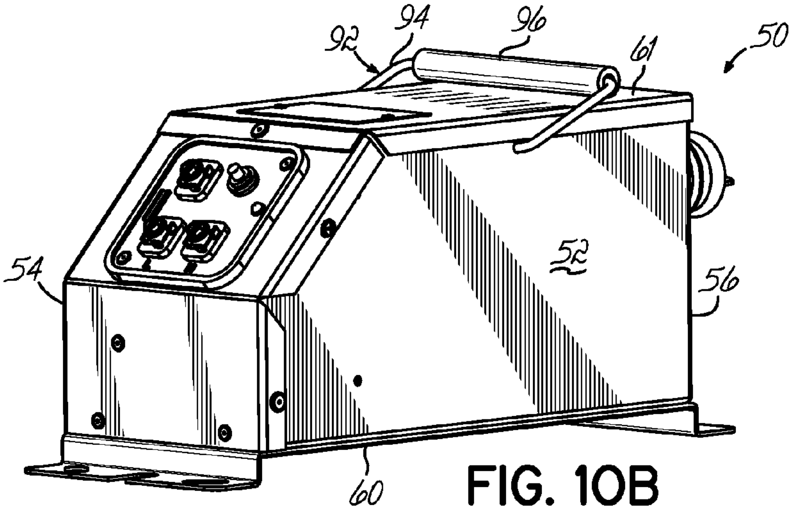
Figure 10C:
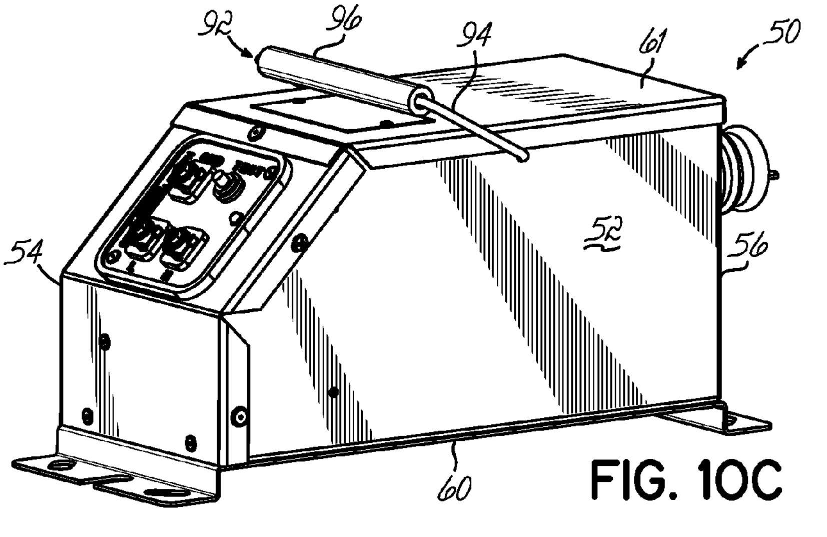

A third embodiment of a handle for the power supply 50 is illustrated in FIGS. 10A-10C. In this embodiment, the handle 92 is mounted in the opposing side walls 52, 54 at a location immediately below upper edges of the side walls 52, 54 and below the cover 61. In this embodiment, the handle 92 is often located longitudinally at a location immediately above a center of gravity of the power supply 50, so that, when the power supply is lifted, the weight of the power supply is balanced, that is, equally distributed on both sides of the handle 92.

Figure 11:
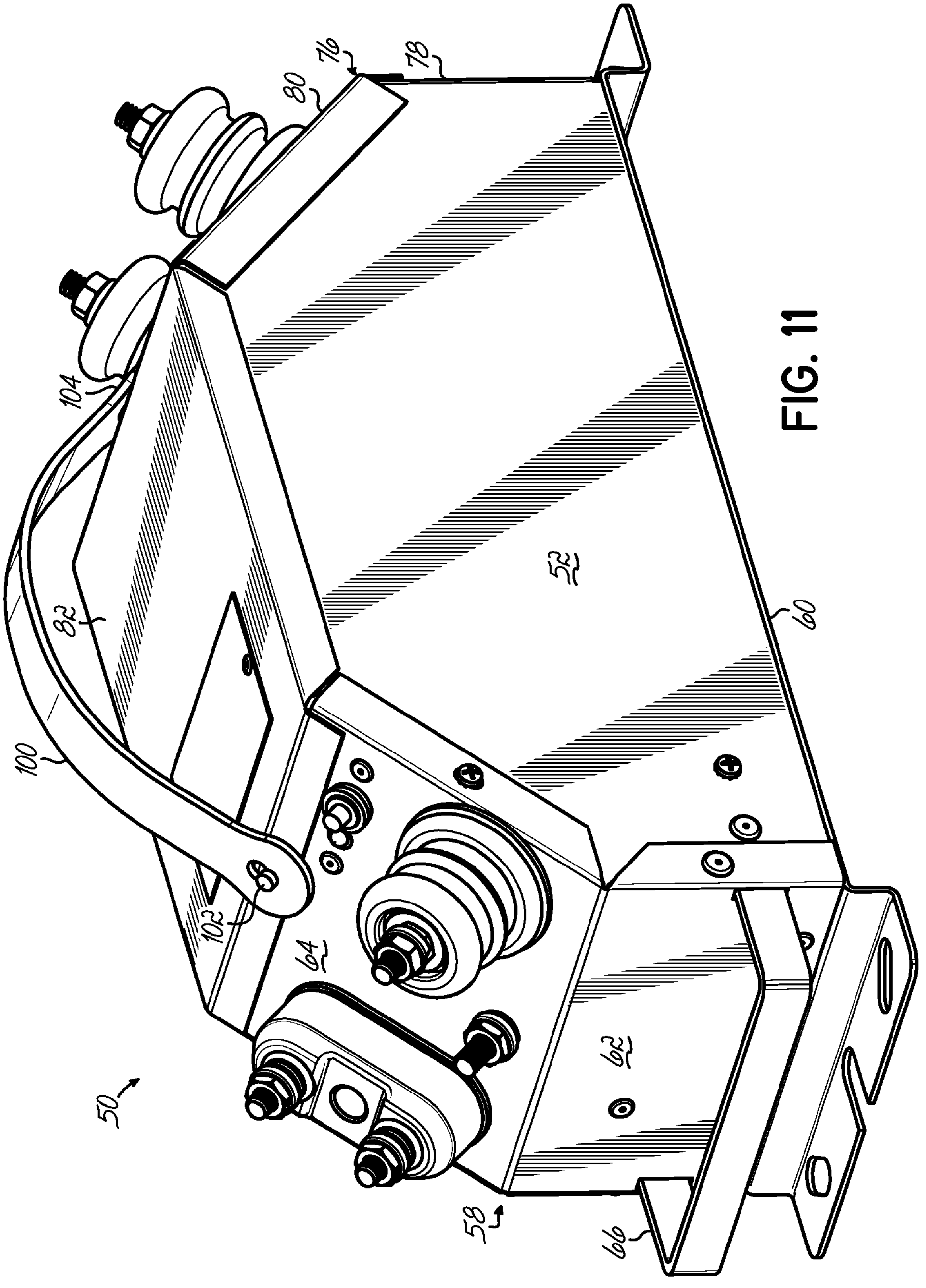
FIG. 11 is a perspective view showing a fifth embodiment of a handle for a gas discharge lamp power supply in accordance with the principles of the present invention.

Referring to FIG. 11, in another embodiment, a handle is made of a strap 100 that extends lengthwise and is connected at its ends to the sloped walls 64, 80. The attachment points 102, 104 of the ends of the handle 100 are selected such that the weight of the power supply 50 is equally distributed on both sides of the handle 100.

Figure 12:
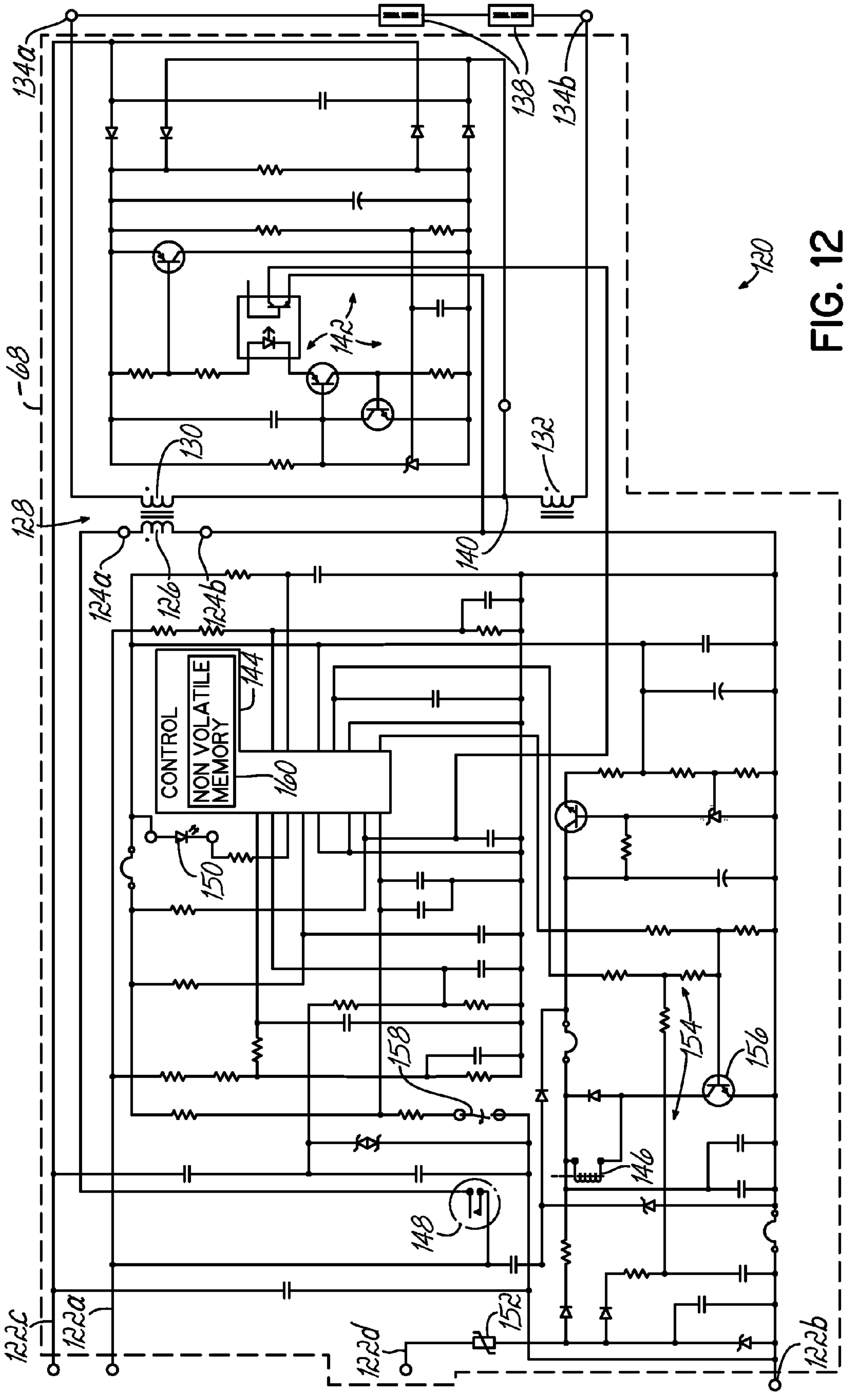
FIG. 12 is a schematic block diagram of gas discharge lamp power supply in accordance with the principles of the present invention.
Figure 13:
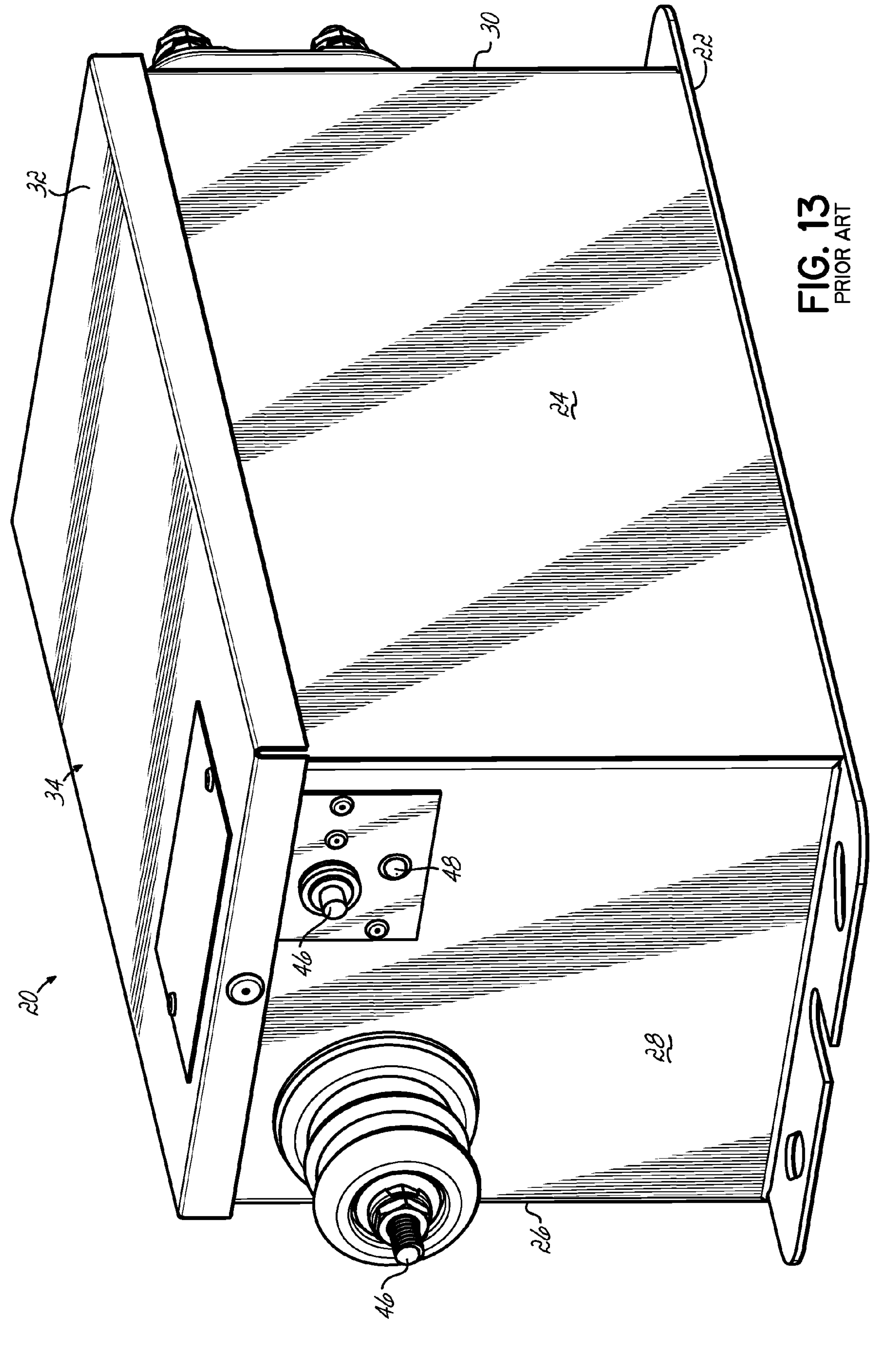
FIG. 13 PRIOR ART
FIG. 13 is a perspective view showing one end of a known gas discharge lamp power supply.

A gas discharge lamp power supply circuit that may be used with any of the embodiments of FIGS. 1-11, as well are other embodiments, is shown in FIG. 12. A power supply circuit 120 has a line, a neutral and an equipment ground input terminals 122*a*, 122*b*, 122*c*, respectively, that are connected respectively to a line, a neutral and a line ground of a line power source in a range of about 120-277 VAC. A further connection 122*d* provides a ground for a power supply enclosure or housing 136 and is connected internally to a surge protector that, in turn, is connected to the equipment ground terminal 122*c*. The input terminals 122*a*, 122*b* provide power to respective terminals 124*a*, 124*b* of a primary winding 126 of a gas discharge lamp transformer 128. Secondary windings 130, 132 provide a higher voltage across output terminals 134*a*, 134*b* to which one or more gas discharge lamps 138, for example, neon tubing, is connected. A common node 140 of the secondary windings 130, 132 is connected through a ground fault current detection circuit 142 to ground in a known manner. If the ground fault detection circuit 142 senses any substantial current flow between the node 140 and ground, an error signal is provided to a power supply controller 144. The controller 144 stores an error code representative of the error signal, closes switch 156 and energizes relay coil 146, thereby opening normally-closed contacts 148 and removing power from the primary coil 126.

A visual indicator 150, for example, a light, LED, etc., is connected to the power supply controller 144. The LED 150 is used to signal an installer or service person of operating and fault conditions within the power supply circuit 120. For example, when the power supply is operating in a normal mode with no fault conditions, the controller 144 maintains the LED 150 in a steady on or illuminated state. In the event the ground fault detection circuit 142 detects a ground fault, an error signal is provided to the controller 144. The controller 144 is operative to cause switch 156 to conduct, which energizes relay coil 146 and opens normally-closed contacts 148, thereby removing power from the transformer 128. The controller 144 also automatically enters a diagnostic mode in response to an error signal from the ground fault detection circuit 142. Upon entering the diagnostic mode, the controller 144 stores a diagnostic mode error code and changes the operation of the LED 150, so that the LED illuminates or pulses once for a short period of time, for example, 100 milliseconds, during a longer period, for example, ten seconds. Thus, every ten seconds, the LED 150 is illuminated for a tenth of a second. Therefore, by observing the LED 150 pulsing once every ten seconds, the installer or service person knows the power supply circuit 120 has a fault condition that the controller 144 is attempting to remedy. As part of the diagnostic mode, after a period of time, the controller 144 will turn off switch 156, thereby de-energizing the coil 146, closing the normally-closed contacts 148 and causing power to be reapplied to the primary coil 126.

In some situations, the condition causing the fault detection will have cleared; and the power supply circuit 120 will resume its normal operation. In that event, the controller 144 causes the LED 150 to again be continuously illuminated in a steady on state. However, if the ground fault condition has not cleared, the controller 144 again energizes the switch 156 and relay coil 146 to open the normally-closed contacts 148 and remove power from the primary coil 126. The operation of the controller 144 in the diagnostic mode is described in more detail in U.S. Pat. No. 6,366,208 referenced earlier.

If, after several attempts to restart the power supply circuit 120 in the diagnostic mode, the ground fault condition continues, the controller 144 stores a ground fault error code and changes the operation of the LED 150 to provide a repeating illumination pattern of 2 pulses every ten seconds. For example, every ten seconds, the LED 150 will be illuminated for successive pulses of about 100 milliseconds with about one second between the pulses. This LED illumination pattern signals the installer or service person that a secondary ground fault condition persists.

The power supply circuit 120 has the further capability of detecting that a secondary ground fault condition exists and there is an improper or open connection of the equipment ground 122*c* to the line ground. In that situation, the power supply chassis or housing 136 will experience a rise in voltage. While the controller 144 would be effective to remove power from the transformer 128, the power supply circuit 120 has a varistor 152, current detection circuit 154 and switch 156 that operates more quickly than the controller 144 to energize the relay coil 146 and open the normally-closed contacts 148. In this example, power is removed from the transformer 28 in response to detecting a surge current to the chassis. In the event of detecting a secondary ground fault with a bad equipment ground connection, the controller 144 stores an open ground error code and changes the operation of the LED 150 to pulse 3 times in a ten second period. This LED pulse code signals the service person to first inspect the ground connection 122*c* for a problem.

In some situations, an installer or service person will connect a transformer 128 having a lower voltage rating, for example, 120 VAC to a higher line voltage, for example, 277 VAC. This will eventually result in failure of the transformer 128. The power supply controller 144 contains an internal comparator that permits it to detect a voltage across the input terminals 122*b*, 122*c* that exceeds the voltage rating of the transformer that is intended for use with the power supply circuit 120. Upon detecting a high voltage across the inputs 122*b*, 122*c*, the controller 144 stores an improper power supply error code and provides an output to close switch 156, energize coil 146 and open normally-closed contacts 148. Further, the controller 144 switches the operation of the LED 150 to pulse 4 times within a ten second period. This signals the installer or service person that the wrong power supply has been installed.

In other situations, an installer or service person may reverse the line and neutral connections to the terminals 122*a*, 122*b* but properly connect the equipment ground 122*c*. In that event, the chassis voltage will again rise. In response to the current detecting circuit 154 detecting a chassis current of about 4 ma, the controller 144 stores an error code representative of a reversed line condition and closes switch 156, thereby energizing the relay coil 146 and opening the normally-closed contacts 148. Thus, power is removed from the transformer 128 and the controller 144 changes the operation of the LED 150 to pulse 5 times within successive ten second periods. This signals the installer or service person to check the connections of the input terminals 122*a*, 122*b* to the line and neutral wires of the line power source.

In the process of servicing a power supply, an installer or service person often switches the power supply to a service mode by closing service switch 158. Upon detecting the service switch being closed, the controller 144 stores a service mode error code that is effective to disable the operation of the secondary ground fault detection circuit 142 for a period of time, for example, 29 minutes. Thus, during that period of time, the service person is able to operate the power supply circuit 120 without its operation being interrupted by the ground fault detection circuit 142. Upon entering the service mode, the controller 144 changes the operation of the LED 150 to flash on and off for equal durations.

Thus, the power supply circuit 120 has the capability of detecting secondary ground faults as well as other fault conditions, and error codes representing those faults are stored within the power supply controller 144. Further, the controller 144 operates the LED 150 in a manner communicating specific error codes to an installer or service person. However, as discussed earlier, when a service person encounters a power supply circuit 120 that has been experiencing problems, the service person most often first disconnects power from the circuit 120 to initially inspect the power supply, its connections, etc. Further, often the location of the power supply circuit 120 is not conducive to visual inspection prior to disconnecting the power. Hence, the power is disconnected without the service person having looked at the operating status of the LED 150. Upon removing power, the error code stored in the controller 144 is lost; and upon re-application of power to the power supply circuit 120, if the fault condition is intermittent and not then present, the previously detected fault state cannot be identified by the service person.

In order to address this problem, the controller 144 contains a nonvolatile memory 160 for storing error codes. The controller 144 and nonvolatile memory 160 can be implemented using a PIC 16F628A microprocessor commercially available from Microchip Technology Inc. of Alpharetta, Ga. Therefore, upon disconnecting power from the power supply circuit 120, the previously detected error code is not lost. Consequently, after the initial inspection, upon power being reapplied, the service person can recall the previously detected error code. For example, upon restoring power, the LED 150 is in a steady illuminated state. Upon depressing the service switch 158 for a period of time, for example, five seconds, the controller 144 turns the LED 150 off. If the service person releases the service switch 158 within a period of time, for example, two seconds, the controller 144 causes the LED 150 to pulse with the previously detected error code. Therefore, the value of the diagnostic capabilities of the power supply circuit 120 is not lost upon power being removed from the circuit 120.

In use, as shown in FIG. 1, with the input and output terminals 36-44 directed upward, an installer or service person can more easily connect leads to the terminals. Further, securing nuts are easier to locate on the terminal studs and thread into place. Therefore, connecting the power supply 50 to a power source and neon tubing can be done in less time with less frustration and stress. Further, the upward presentation of the switch 46 makes it easier to locate and use. In addition, being directed upward, the LED 48 is more easily viewed even if the power supply 50 is located in an electrical raceway. Further, often the power supply 50 is separated from the neon tubing, such that the neon tubing is not visible from the power supply location. The upward presentation of the LED 48 allows a service person to view the LED 48 from some distance, for example, at the location of the neon tubing, even if the power supply 50 is located in an electrical raceway.

In addition, by being able to display a previously diagnosed fault condition after power to the power supply circuit 120 has been removed and then reapplied, the controller 144 having a nonvolatile memory 160 is especially useful when the circuit 120 is experiencing an intermittent fault condition.

The upward presentation of the terminals, switch and LED as well as the nonvolatile storage of error codes provide a gas discharge lamp power supply that is more convenient to install and service, especially in those applications where the power supply is difficult to access, for example, in an electrical raceway. Further, the upward presentation of the terminals, switch and LED as well as the nonvolatile storage of error codes provide a gas discharge lamp power supply that has an improved diagnostic capability that can substantially improve the quality of power supply service in the field.

While the present invention has been illustrated by a description of an embodiment, and while such embodiment has been described in considerable detail, there is no intention to restrict, or in any way limit, the scope of the appended claims to such detail. Additional advantages and modifications will readily appear to those skilled in the art. For example, in the described embodiment, the numerous embodiments illustrate different combinations of locations for the input and output terminals, a service switch and an indicator. As will be appreciated, the illustrated and described embodiments are only exemplary; and many other embodiments are anticipated by the appended claims. Further, in the illustrated and described embodiments, the sloped walls 64, 80 are angled about 45 degrees to a respective bases 60, 74 or a surface on which the power supply rests. In alternative embodiments, the walls 64, 80 can be sloped at other angles that are oblique to the respective bases 64, 80 and respective bottom walls 62, 78 and are effective to direct the terminals and user interface devices upward. However, the height of the bottom walls 62, 78 and the angle of respective sloped walls 64, 80 must be chosen such that ends of the terminals 36-45 and associated securing nuts are maintained below a plane of respective covers 61, 82. In addition, in the described embodiments, the service switch 46 and LED 48 are only examples of user interface devices that can be used with the power supply 50. In alternative embodiments, other known user interface devices can be used that allow a user to provide commands to, and receive output displays from, the power supply.

In the described embodiment of a power supply circuit, a particular microprocessor with a nonvolatile memory is identified, however, in alternative embodiments, other microprocessors may be used to provide a nonvolatile memory. Further, the function of a nonvolatile memory may be achieved using other circuits and devices known in the art. In the described embodiment, a single LED 150 is described as providing error codes to a service person; however, in alternative embodiments, multiple visual indicators, the neon tubing 138 or other means may be used to communicate the error codes to an installer or service person.

Therefore, the invention in its broadest aspects is not limited to the specific details shown and described. Consequently, departures may be made from the details described herein without departing from the spirit and scope of the claims which follow.

What is claimed is:

1. A gas discharge lamp power supply comprising:

a transformer having a primary winding and a secondary winding;

input terminals connectable to the primary winding and adapted to be connected to a source of electrical power;

output terminals connected to the secondary winding and adapted to be connected to a gas discharge lamp;

a fault detection circuit providing an error signal in response to detecting a fault condition, wherein the fault detection circuit is connected to a chassis and the error signal is produced in response to detecting a current flow in the chassis;

a control comprising a nonvolatile memory, the control storing an error code in the nonvolatile memory in response to the error signal, and an error indicator connected to the control and being activated by the control in response to the error signal.

2. The power supply of claim 1 wherein the control disconnects the source of electrical power from the primary winding in response to the error signal.

3. The power supply of claim 1 wherein the fault detection circuit comprises a ground fault detection circuit connected to the secondary winding and the error signal represents a secondary ground fault interrupt.

* * * * *